(No Model.)

T. S. VERY.
BREECHING BUCKLE.

No. 374,764. Patented Dec. 13, 1887.

WITNESSES.
John Long
H. Brown

INVENTOR.
T. S. Very
by Wright Brown & Crosby
Att'y

N. PETERS, Photo-Lithographer, Washington, D. C.

United States Patent Office.

THEODORE S. VERY, OF BOSTON, MASSACHUSETTS.

BREECHING-BUCKLE.

SPECIFICATION forming part of Letters Patent No. 374,764, dated December 13, 1887.

Application filed September 6, 1886. Serial No. 212,813. (No model.)

*To all whom it may concern:*

Be it known that I, THEODORE S. VERY, of Boston, in the county of Suffolk and State of Massachusetts, have invented certain new and useful Improvements in Breeching-Loops, of which the following is a specification.

This invention has for its object to provide improvements in that part of a horse's harness that supports the breeching—viz., the hip-strap—which is secured to the back-strap of the harness and extends downwardly over the hips to the breeching.

My invention consists, first, in the combination of a buckle constructed as hereinafter described, a breeching-supporting loop engaged with said buckle, and a hip-strap, also engaged with the buckle, the said combination being and operating as hereinafter expressed.

Figure 1:
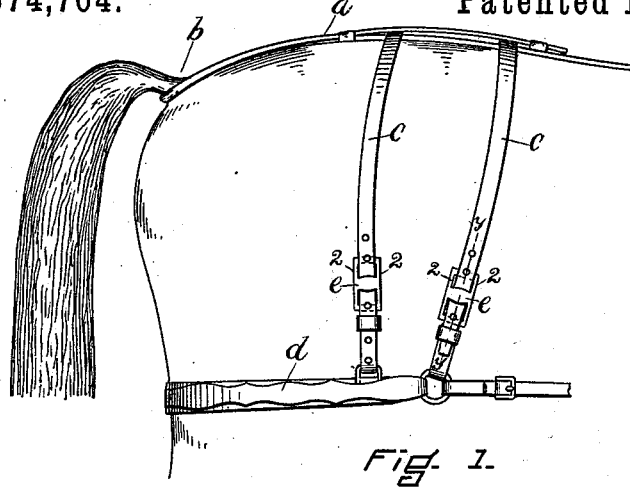
Figure 5:
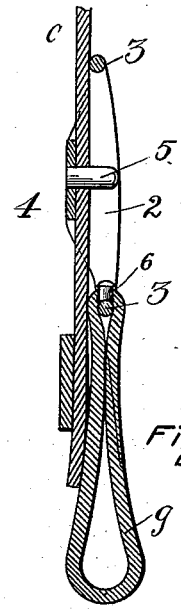
Figure 2:
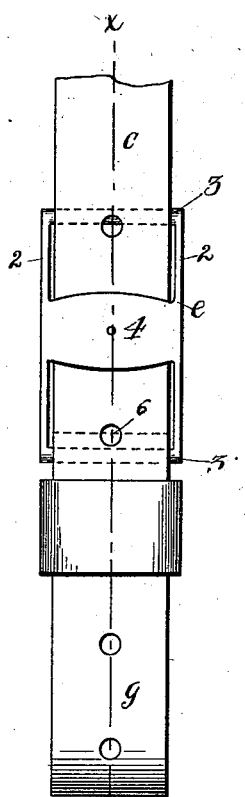
Figure 3:
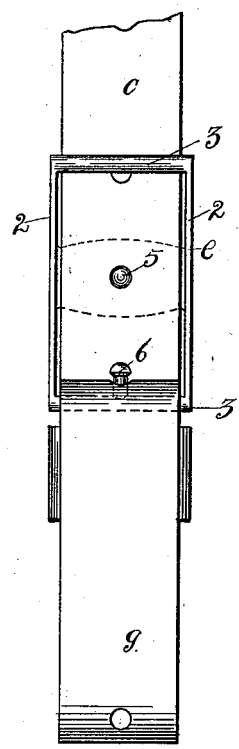
Figure 4:
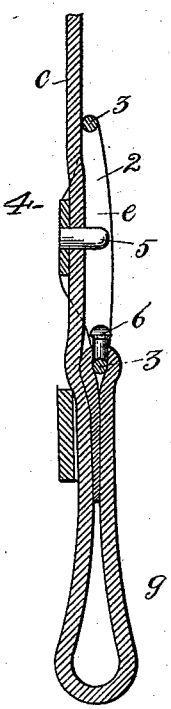

Of the accompanying drawings, forming a part of this specification, Figure 1 represents a side view of the portion of the harness to which my improvement relates. Fig. 2 represents an enlarged view of the particular part embodying my invention. Fig. 3 represents a view of the inner side of the part shown in Fig. 2. Fig. 4 represents a section on line $x$ $x$, Fig. 2. Fig. 5 represents a section on line $y$ $y$, Fig. 1.

The same letters of reference indicate the same parts in all the figures.

In the drawings, $a$ represents the back-strap of a harness, terminating in the crupper $b$.

$c$ represents the hip-strap, which is secured to the back-strap and extends downwardly over the hips and supports the breeching $d$.

$e$ represents a buckle composed of two parallel side pieces, 2 2, two parallel end pieces, 3 3, connecting the side pieces and at right angles therewith, and a cross-bar, 4, between the end pieces, but offset therefrom, as shown in Figs. 4 and 5, the side pieces, 2 2, being widened centrally and the cross-bar 4 attached to or formed on them out of line with the end pieces, 3 3. The cross-bar 4 has a stud or finger, 5, projecting from its inner side into the space between the side pieces, 2 2, said finger being engaged with the hip-strap by passing through a hole therein, as shown. One of the end pieces, 3, has a finger, 6, projecting laterally from it, as shown in Figs. 3 and 4.

$g$ represents a loop composed of a strap, which is engaged with the lower end piece, 3, by passing the finger 6 on said end piece through a hole in said strap, the latter passing downwardly from the buckle through an eye or ring on the breeching, and from thence back to the buckle, said loop constituting the connection between the buckle and breeching. The loop may be entirely independent of the hip-strap, as shown in Fig. 5, in which case the ends of the strap forming the loop will be sewed together.

In Figs. 1, 2, 3, and 4 I have shown the loop and hip-strap formed in one piece, the lower end of the hip-strap forming the loop and being bent over the lower cross-piece of the buckle and engaged with the finger 6 thereof.

It will be seen that in either case the buckle is capable of quick and easy adjustment on the hip strap to raise and lower the breeching, all that is required to adjust the buckle being to press the strap $c$ off from the finger 5, move the buckle up or down, and insert the finger in another hole of the strap.

The finger 6 on the lower cross-bar enables the buckle to be easily applied to and detached from the loop $g$.

The improvement may be used with a breast-plate, the strap $c$ and loop $g$, made in one piece, being substituted for the usual strap that suspends the breast-plate from the animal's neck.

I claim—

The improved harness-buckle composed of the marginal frame having on one of its end pieces a stud or finger adapted to engage a breeching-supporting loop and extending in the direction of the length of the frame and the cross-bar, and having the stud or finger adapted to engage a back-strap independent of said loop, as set forth.

In testimony whereof I have signed my name to this specification, in the presence of two subscribing witnesses, this 27th day of August, 1886.

THEODORE S. VERY.

Witnesses:
  C. F. BROWN,
  A. D. HARRISON.